(12) United States Patent
Kuribayashi

(10) Patent No.: US 7,274,484 B2
(45) Date of Patent: Sep. 25, 2007

(54) IMAGE FORMING APPARATUS

(75) Inventor: Yasushi Kuribayashi, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 868 days.

(21) Appl. No.: 10/349,956

(22) Filed: Jan. 24, 2003

(65) Prior Publication Data

US 2004/0145779 A1 Jul. 29, 2004

(51) Int. Cl.
*G06F 15/00* (2006.01)
*G06F 13/12* (2006.01)

(52) U.S. Cl. .................................. 358/1.17; 710/71

(58) Field of Classification Search ............... 358/1.17, 358/1.14, 434, 451; 370/328, 352; 709/200, 709/203; 399/27, 70; 710/62, 71, 72; 711/103, 711/133; 715/512
See application file for complete search history.

(56) References Cited

U.S. PATENT DOCUMENTS 5,791,790 A * 8/1998 Bender et al. ............... 400/61

FOREIGN PATENT DOCUMENTS

| JP | 2-94960 A | 4/1990 |
|---|---|---|
| JP | 6-219022 A | 8/1994 |
| JP | 7-276742 A | 10/1995 |
| JP | 2000-94795 A | 4/2000 |

* cited by examiner

*Primary Examiner*—King Y. Poon
*Assistant Examiner*—Saeid Ebrahimi
(74) *Attorney, Agent, or Firm*—Foley & Lardner LLP

(57) ABSTRACT

An image forming apparatus includes a private port selected from a group composed of a plurality of user's private ports assigned to a plurality of users, individually, and two or more function-only ports, a reception buffer which temporarily saves a print job received through the private port, and a setting/save section which is provided corresponding to the private port and saves set data on the printing system. A printing section of the apparatus reads the set data on the printing system from the setting/save section corresponding to the user's private port through which the print job is received when the print job stored in the reception buffer is printed and prints the job in accordance with the set data.

3 Claims, 5 Drawing Sheets

IMAGE FORMING APPARATUS

BACKGROUND OF THE INVENTION

1. Field of the Invention

The present invention relates to an image forming apparatus that is accessible to a plurality of users through ports.

2. Description of the Related Art

Described in Jpn. Pat. Appln. KOKAI Publication No. H-219022 is an image forming apparatus in which operating conditions that are individually set for a plurality of ports are stored, and input data is printed under designated port conditions. This image forming apparatus has a plurality of physical ports for print data reception, and is constructed so that it can be shared by a plurality of external data processors. Each port of this apparatus has a memory for storing preset operation setting values. Preset operation setting values corresponding to the ports through which print data is received are read from the memories in response to the reception of print data. A printing operation is carried out with its contents determined by the read preset operation setting values. According to this technique, operation setting corresponding to each port is automatically performed in response to reception of print data. Therefore, operation setting for each print is unnecessary under the same conditions, so that facility is improved, and misprints that are attributable to wrong operation setting can be prevented. The ports are individual ports that are based on a physical interface. In some cases, therefore, only one terminal unit can be connected to the apparatus, depending on the interface shape.

With the progress in networks, the relation between the image forming apparatus and a terminal unit, such as a computer unit, has recently changed from a peer-to-peer system to a server/client system. Thus, a number of terminal units can be connected to one image forming apparatus. This implies that one user has a plurality of terminal units for the image forming apparatus. If a user has a plurality of terminal units in this manner, set print data, such as the image quality data on the image forming apparatus, scaling, etc., are saved on each terminal unit side, so that the print data must be set for each terminal unit. Further, the spread of color image forming apparatuses has made the image quality data highly detailed and complicated. Therefore, it is hard to reproduce with other terminal units the image quality data obtained by trial and error with use of a certain terminal unit. PDAs, portable telephones, etc., cannot cope with complicated settings, due to their operation. Under the circumstances for these units, therefore, a lot of users print defaults.

The image forming apparatus starts printing immediately after a print file is transmitted through a reception port. This is done because other print files inevitably accumulate unless the image forming apparatus immediately runs the received print file, since the route along which the reception port, a reception buffer, and a printing engine are arranged is one-way.

BRIEF SUMMARY OF THE INVENTION

There is a need for an image forming apparatus designed so that a plurality of users who use the image forming apparatus can improve their facility by accessing the image forming apparatus through ports that are assigned individually to them and reading various pieces of information corresponding to the ports.

According to an aspect of the present invention, an image forming apparatus comprises a private port selected from a group composed of a plurality of user's private ports assigned to a plurality of users, individually, and two or more function-only ports, a reception buffer which temporarily saves a print job received through the private port, and a setting/save section which is provided corresponding to the private port and saves set data on the printing system. The apparatus further comprises a printing section which reads the set data on the printing system from the setting/save section corresponding to the user's private port through which the print job is received when the print job stored in the reception buffer is printed and prints the print job in accordance with the read set data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Individual embodiments of the present invention will now be described with reference to the drawings.

FIRST EMBODIMENT

Figure 1:
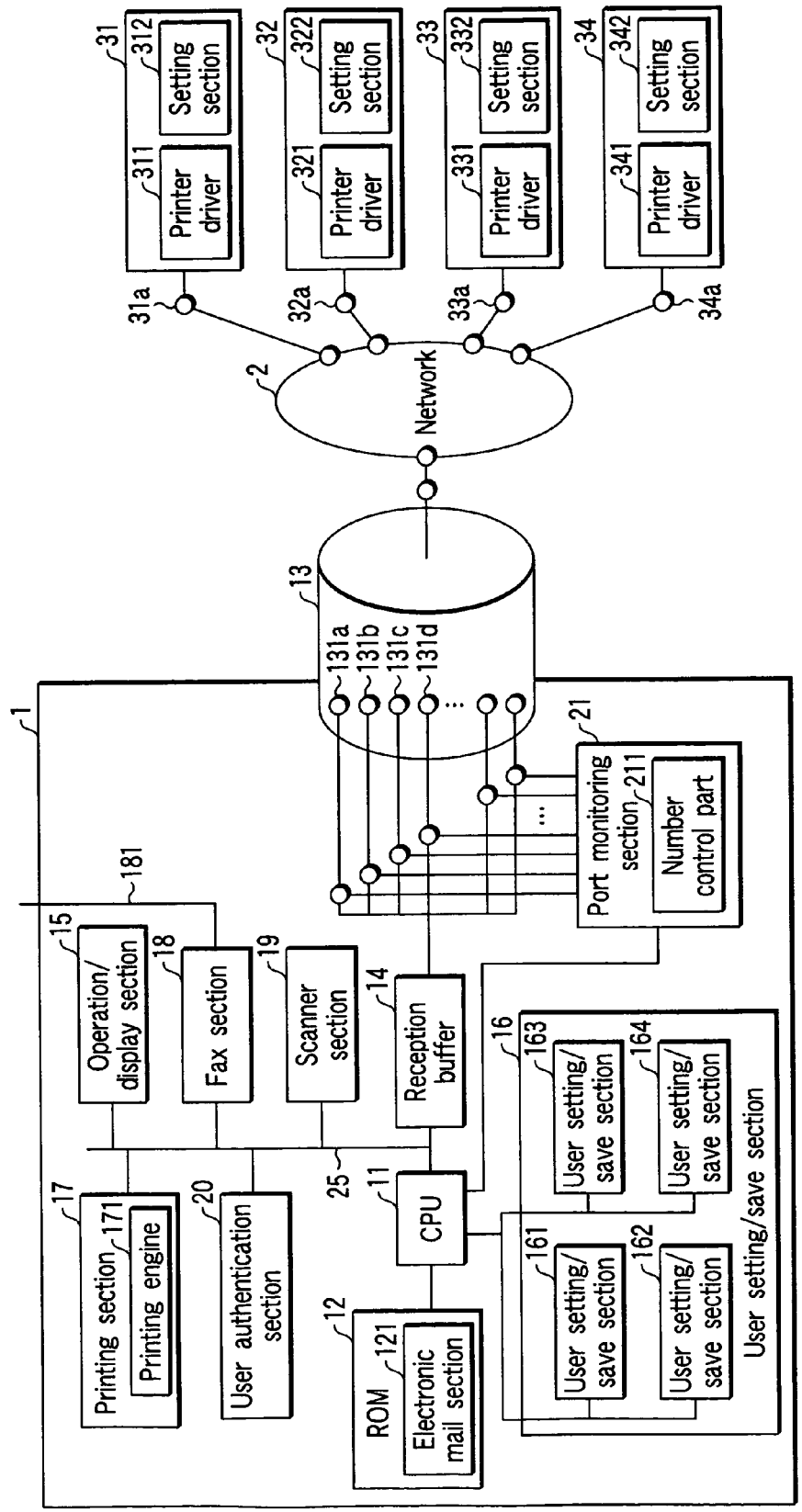
FIG. 1 is a diagram showing an outline of a multifunction apparatus according to a first embodiment of the invention and a configuration of a network to which the apparatus is connected.

FIG. 1 shows a configuration of a network to which an image forming apparatus and a plurality of terminal units are connected. The image forming apparatus described herein is a multifunction apparatus 1 that has a function to be connected to the network 2, a printer function, a fax function, and a scanner function, etc. The network 2 is connected with terminal units 31, 32, 33 and 34 through physical ports 31a, 32a, 33a and 34a, respectively. Each of the terminal units 31 to 34 is a personal computer (PC) that has a display unit and the like, for example. These sections constitute a client (terminal unit)/server (multifunction apparatus) system.

The terminal units 31, 32, 33 and 34 are provided with printer drivers 311, 321, 331 and 341 and setting sections 312, 322, 332 and 342, respectively. The printer drivers cause the multifunction apparatus 1 to execute printing. The setting sections store set data on printing.

The multifunction apparatus 1 comprises a CPU 11, ROM 12, interface section 13, reception buffer 14, operation/display section 15, user setting/save section 16, printing section 17, fax section 18, scanner section 19, user authentication section 20, and port monitoring section 21.

The CPU 11 is connected to the ROM 12, reception buffer 14, operation/display section 15, user setting/save section 16, printing section 17, fax section 18, scanner section 19, user authentication section 20, and port monitoring section 21 by means of bus lines 25.

The CPU 11 controls the multifunction apparatus 1 by executing a control program stored in the ROM 12. The ROM 12 is provided with an electronic mail section 121 that is loaded with a control program that enables electronic mail in the network 2.

The interface section 13 is connected to the network 2 through physical ports 131. The interface section 13 is provided with user's private ports corresponding individually to those users who are allowed to be connected to the network. More specifically, user's private ports 131a, 131b, 131c and 131d are assigned to users of the terminal units 31, 32, 33 and 34, respectively.

The individual user's private ports 131a, 131b, 131c and 131d are not limited to the physical ports and also include logic ports that are classified as data flows. Communication addresses called "port numbers" for data transfer between a transport layer and an application layer are utilized in protocols such as a transmission control protocol/internet protocol (TCP/IP). In the case of the TCP/IP, the use of the port numbers enables different pieces of software to simultaneously transmit and receive different data. In this network environment, the "port number" for each user is provided on the boundary between the transport layer and the application layer in the multifunction apparatus 1. When a user transmits data from the terminal unit to the multifunction apparatus 1, the IP addresses of the multifunction apparatus 1 and its own port numbers are attached to header information. In consequence, the data can be securely transmitted to the user's private port that is assigned to the user. Thus, the user's private ports 131a, 131b, 131c and 131d are logic ports, so that the terminal units 31 to 34 can be connected to the multifunction apparatus 1 so as to correspond to the user's private ports even if only one of the physical port 131 is used. The user's private ports may be physical ports only if they can be increased in number by the use of hubs such as Ethernets, universal serial buses (USB), etc. Wire or radio communication may be used with the same result. Further, the multifunction apparatus 1 may be provided with a plurality of IP addresses and/or port numbers so that it has a plurality of user's private ports. When print jobs are transmitted from the terminal units 31 to 34 to the multifunction apparatus 1, the IP addresses of the multifunction apparatus 1 and the port numbers of the user's private ports are attached to the head information of the print jobs. Thereupon, the print jobs can be transmitted to designated user's private ports without regard to the intermediate form of the network.

The reception buffer 14 temporarily saves the print jobs received from the terminal units 31 to 34 that are connected to the network 2 through the user's private ports 131a, 131b, 131c and 131d that are assigned to the individual users.

Under the control of the CPU 11, the operation/display section 15 accepts a user's instruction by means of its operation part and displays necessary information for the user. The operation part accepts set data to be stored in the user setting/save section 16.

The user setting/save section 16 is provided with user setting/save sections corresponding to the user's private ports, individually. More specifically, the user setting/save section 16 is provided with user setting/save sections 161, 162, 163 and 164 corresponding to the user's private ports 131a, 131b, 131c and 131d, respectively. The user setting/save sections 161 to 164 are stored with the following set data. Various set data that is stored includes set data on the printing function for each user who uses the multifunction apparatus 1, set data for copying, such as printing density, image quality data, etc., and set data for original scanning, such as resolution, storage area, etc. The stored data further includes set data for FAX transmission, such as resolution, destination telephone number, etc., and set data for electronic mail transmission, such as resolution, destination address, etc. The stored set data also includes graphical user interface (GUI) data, such as set data for a mode in which the operation part of the operation/display section 15 for the setting operation can be set in detail and a simple setting mode, and set data on languages, such as Japanese, English, etc.

The multifunction apparatus 1 is loaded with parameters for operating the printing section 17 that is set by a serviceman who performs maintenance, besides set data the user of the terminal unit accepts by directly operating the operation/display section 15. These parameters include, for example, a parameter for toner consumption that settles "image quality preference" or "cost preference" in printing, the coefficient of an MTF filter to determine whether to make characters sharp or soft in adjusting the image quality, and the coefficients of other image processing filters. Normally, fixed values are used for these parameters, since setting them requires fine setting and specialist knowledge. These parameters can be reset according to each user's preference by storing set data for each user in the user setting/save sections 161 to 164. In this case, the serviceman is expected to set the parameters for each user. However, the parameters can be set without requiring the serviceman's setting if a setting wizard for the parameter setting is provided so that each user's terminal unit can be used for the setting.

The user can change the contents stored in the user setting/save section by him- or herself according to printing properties immediately before starting usual printing. The user may change the stored set print data by accessing his/her own user setting/save section of the multifunction apparatus at any desired time.

The printing section 17 processes the print jobs delivered from the reception buffer 14 by means of its printing engine 171 in accordance with the set data in the user setting/save section 16 and the like, and successively delivers its processed images to paper, thereby forming an image. The printing section 17 also forms image data received by the fax section 18 and an image scanned by the scanner section 19.

The fax section 18 has a facsimile function, and its telecommunication line 181 is connected to a public telephone line to allow the section 18 to communicate with another facsimile or the like.

The scanner section 19 has a scanner function and scans an original document that is located in a given position. Copying can be achieved by printing the scanned image by the printing section 17.

The user authentication section 20 is used to authenticate the users when the individual users who use the terminal units 31 to 34 directly operates the multifunction apparatus 1 to perform copying, scanning, fax transmission, E-mail transmission, etc. The user authentication section 20 authenticates the users in the following manner. The user authentication section 20 accepts from the operation/display section 15 passwords that are allotted to the individual users and authenticates the users. Further, the user authentication section 20 reads information on the user authentication from ID cards by means of a card reader and authenticates the users. The user authentication section 20 is provided with a fingerprint collation part, which authenticates the users by collating their fingerprints with previously registered ones. As each user is specified by this user authentication, the user setting/save section 16 that is set corresponding to each user's private port can be accessed to read various stored set data.

The port monitoring section 21 monitors for each port the number of prints produced by the print jobs that circulate through the user's private ports 131a, 131b, 131c and 131d and the type of prints, monochromatic or color. A number control part 211 controls the number of prints for each user and the like. It can also control the number of copies for each user in the case of copying or the like if the copying or the like cannot be carried out without the user authentication in the user authentication section 20. Thus, number control related to the print output for each user can be carried out as well as number control related to the print output of the entire multifunction apparatus 1. The predetermined control executed by the number control part 211 is control such that the color print output for each month is restricted for each user, and that those users who exceed the restriction are not allowed to perform color printing.

If the terminal units are different apparatuses, such as a digital camera, PDA, portable telephone, etc., the color of pictures delivered to the individual display parts is controlled by different methods. In some cases, therefore, the print output may vary if the print jobs transmitted from the terminal units of different types are printed. To avoid this, setting sections 312, 322, 332 and 342 of the terminal units, for example, may be provided with values for correcting differences in color reproducibility between the terminal units in setting data for printing. In this case, the user setting/save section 16 of the multifunction apparatus 1 is stored with other set data. Thus, when the multifunction apparatus 1 is stored with all the set data, the print output color can be prevented from varying due to the differences in color reproducibility that are attributable to the differences between the terminal units connected.

The following is a description of the way the multifunction apparatus 1 operates when a print job is transmitted from any of the terminal units to the multifunction apparatus 1 and printed. The following is a description of the case where the user of the terminal unit 31 transmits the print job.

When the user who uses the terminal unit 31 transmits the print job to the multifunction apparatus 1, the print job is transmitted to the user's private port 131a that is assigned to the terminal unit user based on the header information. In the multifunction apparatus 1, the reception buffer 14 is temporarily stored with the print job that is delivered through the user's private port 131a. When the print job is processed by means of the printing engine 171, the CPU 11 reads set print data that is stored by accessing the user setting/save section 16 corresponding to the user's private port 131a. The print job is processed with use of the read set print data and printed on the paper.

The multifunction apparatus 1 constructed in this manner is provided with the user's private ports 131a to 131d, so that it can print the print jobs transmitted from the terminal units in accordance with the set print data of the individual users.

In performing printing through another terminal unit, moreover, the user can designate the user's private port that is assigned to him- or herself and transmit the print jobs. By doing this, the user can print the print jobs by means of any of the terminal units that can be connected to the multifunction apparatus 1, in accordance with the set print data that is stored in the user setting/save section by him- or herself.

SECOND EMBODIMENT

A second embodiment will now be described. Further, like portions of the two embodiments are designated by like numerals, and a detailed description is omitted.

Figure 2:
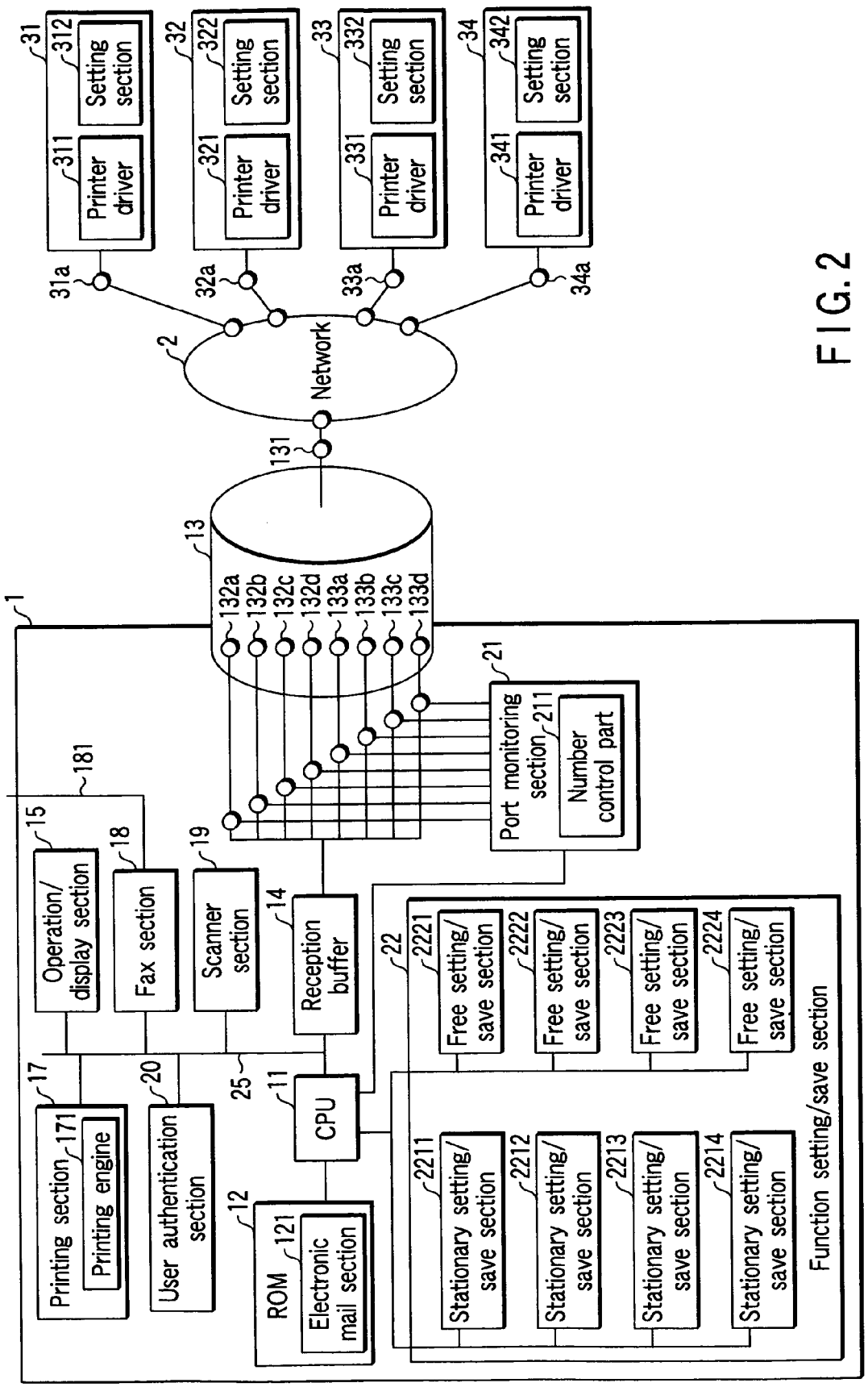
FIG. 2 is a diagram showing an outline of a multifunction apparatus according to a second embodiment of the invention and a configuration of a network to which the apparatus is connected.

The following is a description of differences between the first and second embodiments. As shown in FIG. 2, an interface section 13 is provided with function-only ports 132a, 132b, 132c, 132d, 133a, 133b, 133c and 133d. The function-only ports 133a, 133b, 133c and 133d are ports that are assigned to users of terminal units 31, 32, 33 and 34, respectively. A function setting/save section 22 is provided in place of the user setting/save section 16. The function setting/save section 22 is provided with stationary setting/save sections 2211, 2212, 2213 and 2214 and free setting/save sections 2221, 2222, 2223 and 2224. The specific setting/save sections 2211 to 2214 are made to correspond to the function-only ports 132a to 132d, respectively, and the free setting/save sections 2221 to 2224 to the function-only ports 133a to 133d, respectively.

The stationary setting/save sections 2211 to 2214 are stored with set values for control commands of the printing engine 171 to switch the printing systems. The set values are fixed values in the multifunction apparatus 1. The individual stationary setting/save sections are stored with a template of set print values related to the printing functions that are provided in advance in the multifunction apparatus 1. These set values are semifixed values the users cannot freely change. The semifixed values allow a administrator of the multifunction apparatus 1 to change the types and contents of the set data to serve the users' needs.

The set data which is frequently used by the users of the terminal units 31 to 34 is stored as set data on the printing systems and the printing functions to be stored in the stationary setting/save sections.

In order to switch the printing systems, the users can freely store by preference the free setting/save sections 2221 to 2224 with set values for the control commands of the printing engine 171 and set print values related to the printing functions. Thus, the set data which is frequently used by the users is saved. Although each terminal unit is provided with one free setting/save section in the example described above, a plurality of function-only ports may be allotted to each terminal unit. In this case, a free setting/save section is allotted to each of these ports.

The set data on the printing systems include "monochromatic", "color", "resolution: 1,200 dpi", "resolution: 600 dpi", etc. If a set value for "monochromatic" is stored in the stationary setting/save section that corresponds to the function-only port 132a, for example, the function-only port 132a serves as a port that makes the multifunction apparatus 1 operate as a monochromatic printer. The set data for the printing systems given in this example is expected to be changed most frequently and is set data that is used most frequently for the terminal units 31 to 34.

By allotting the printing systems individually to the function-only ports 132a to 132d in this manner, a plurality of imaginary printers that have functions corresponding to the function-only ports can be viewed from the terminal units. Thus, the user can execute color printing, for example, merely by selecting "CHOOSE MULTIFUNCTION MACHINE FOR COLOR PRINTING". In executing printing through applications of operation systems for operating a lot of existing terminal units, three items, "CHOOSE MULTIFUNCTION MACHINE", "OPEN PRINTING PROPERTIES OF MULTIFUNCTION MACHINE", and "CHANGE VARIOUS SET DATA" are selected in succession. Each function-only port can reduce the number of these steps of procedure to one.

Further, independent printing properties can be obtained by means of the printing systems. The multifunction apparatus 1 can be made easier to use by storing the free setting/save sections with set data that are obtained by customizing specialized versions of the individual printing systems. In monochromatic printing, for example, unnecessary items related to colors, which are essential to setting for color printing, can be omitted.

The set data on the printing functions include "bookbinding operation", "double-sided printing", "stapled", "simple binding", "punched", "N in 1", etc. If a set value for "bookbinding operation" is stored in the stationary setting/save section that corresponds to the function-only port 132b, for example, the function-only port 132b serves as a port that makes the multifunction apparatus 1 operate as a bookbinding machine.

By allotting the printing functions for some purposes individually to the function-only ports in this manner, the user can execute a bookbinding operation, for example, merely by selecting "CHOOSE MULTIFUNCTION MACHINE FOR BOOKBINDING", as in the case where the set print data is allotted.

Further, independent printing properties can be obtained by means of these printing functions. Thereupon, the multifunction apparatus 1 can be made easier to use by storing the function setting section with set data that are obtained by customizing specialized versions of the individual printing functions. In executing printing through applications of operation systems for operating a lot of existing terminal units, there are so many functions that the setting operation is complicated. Let it be supposed that the user performs simple staple binding based on double-sided printing. The user follows three steps of procedure including "CHOOSE MULTIFUNCTION MACHINE", "OPEN PRINTING PROPERTIES OF MULTIFUNCTION MACHINE", and "SET FOR DOUBLE-SIDED PRINTING, BINDING MARGIN, STAPLING". The user cannot achieve his/her desired printing unless he/she follows all three steps of procedure. The number of these procedural steps can be reduced to one by allotting the printing functions to the function-only ports.

One user may frequently use a printing function that is rarely used by another. In order to satisfy these users' needs, the users are provided with respective function-only ports 133a to 133d, whereby the printing functions can be freely customized for the individual users. The users previously set the free setting/save sections corresponding to those function-only ports which are assigned to them with the functions they use frequently. Thus, the users can quickly execute printing based on their desired set data merely by inputting "PRINTING WITH FREQUENTLY USED FUNCTIONS" on the terminal units. Since the users freely customize the printing functions in this manner, only they can use the function-only ports that are assigned to them.

In performing double-sided printing with "2 in 1" in order to save paper for distribution materials, for example, a user follows steps of procedure including "CHOOSE MULTIFUNCTION MACHINE", "OPEN PRINTING PROPERTIES OF MULTIFUNCTION MACHINE", "DOUBLE-SIDED PRINTING", "2 in 1". The use of the function-only ports can reduce the procedural steps to one, "CHOOSE MULTIFUNCTION MACHINE INTENSIVELY HAVING FREQUENTLY USED FUNCTIONS". If the frequency of use of a certain set data is high, this set data can be saved as a default value. If this default value is used as the set data, however, the data must be reset for normal printing. This situation can be avoided by the agency of the function-only ports 133a to 133d in the multifunction apparatus 1.

Currently, the printing systems and the printing functions of image forming apparatuses such as multifunction apparatuses are diverse. The users can quickly and easily select set data on printing by executing printing for the function-only ports of the multifunction apparatus 1. Since the set print data and the printing functions can be easily selected in this manner, those items which cannot be set unless they are pursued deep into the hierarchy from the printing properties can be set in advance. Thus, the users' facility of use can be improved.

The multifunction apparatus may be provided with the user's private ports described in connection with the first embodiment and the function-only ports described in connection with the second embodiment. If these various ports can be set in this manner, some users may have a plurality of ports. In this case, common data may be set in advance if the fixed set values for control commands to switch the printing systems and the preset values for the printing functions are common. These systems serve individually for the users, so there must be as many systems as users of multifunction apparatuses.

Having this construction, the multifunction apparatus 1 can print with the same set print data and easily switch the set print data without regard to the terminal units connected to it. Thus, the users' ease of operation is improved further.

THIRD EMBODIMENT

A third embodiment will now be described. In the description to follow, like portions of the embodiments are designated by like numerals, and a detailed description is omitted.

Figure 3:
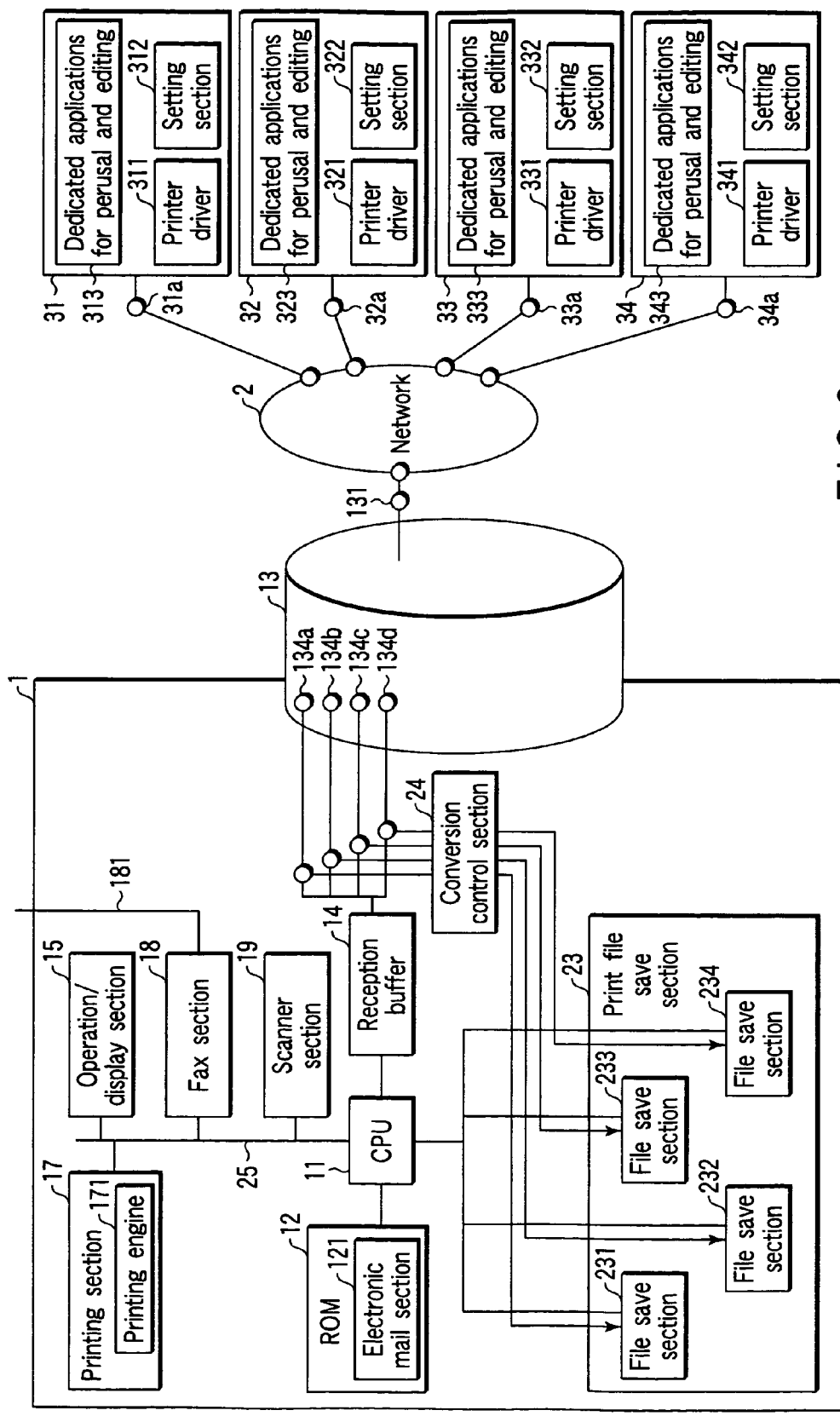
FIG. 3 is a diagram showing an outline of a multifunction apparatus according to a third embodiment of the invention and a configuration of a network to which the apparatus is connected.

The following is a description of differences between the first and third embodiments. As shown in FIG. 3, an interface section 13 is provided with reception ports 134a, 134b, 134c and 134d, which are assigned to users of terminal units 31 to 34, respectively. A print file save section 23 is provided in place of the user setting/save section 16. The print file save section 23 is provided with file save sections 231 to 234 corresponding to the reception ports 134a to 134d, respectively.

The reception ports 134a to 134d are connected to a reception buffer 14 and a conversion control section 24. The conversion control section 24 is located between the print file save section 23 and the reception ports 134a to 134d, and converts print jobs for a document received through the reception ports into files. More specifically, the print jobs are converted into an electronic document of a general format that is used in the network. It is unnecessary, therefore, to use any server that converts the print jobs for the document into a general distributable format.

The terminal units 31 to 34 are loaded with dedicated applications 313, 323, 333 and 343 for perusing and editing files stored in the print file save section 23. By designating the reception ports, the files stored in all the file save sections 231 to 234 can be perused by means of the dedicated applications 313 to 343. The files can be perused and edited by means of general web browsers in place of the dedicated applications.

The apparatus of this embodiment, unlike that of the first embodiment, is not provided with the user authentication section 20 and the port monitoring section 21.

The following is a description of processing related to printing of the files stored in the file save sections by the users, that is, processing of the terminal units and the multifunction apparatus 1 for confirmation and editing, in the network 2 to which the multifunction apparatus 1 and the terminal units 31 to 34 constructed in aforesaid manner are connected.

Figure 4:
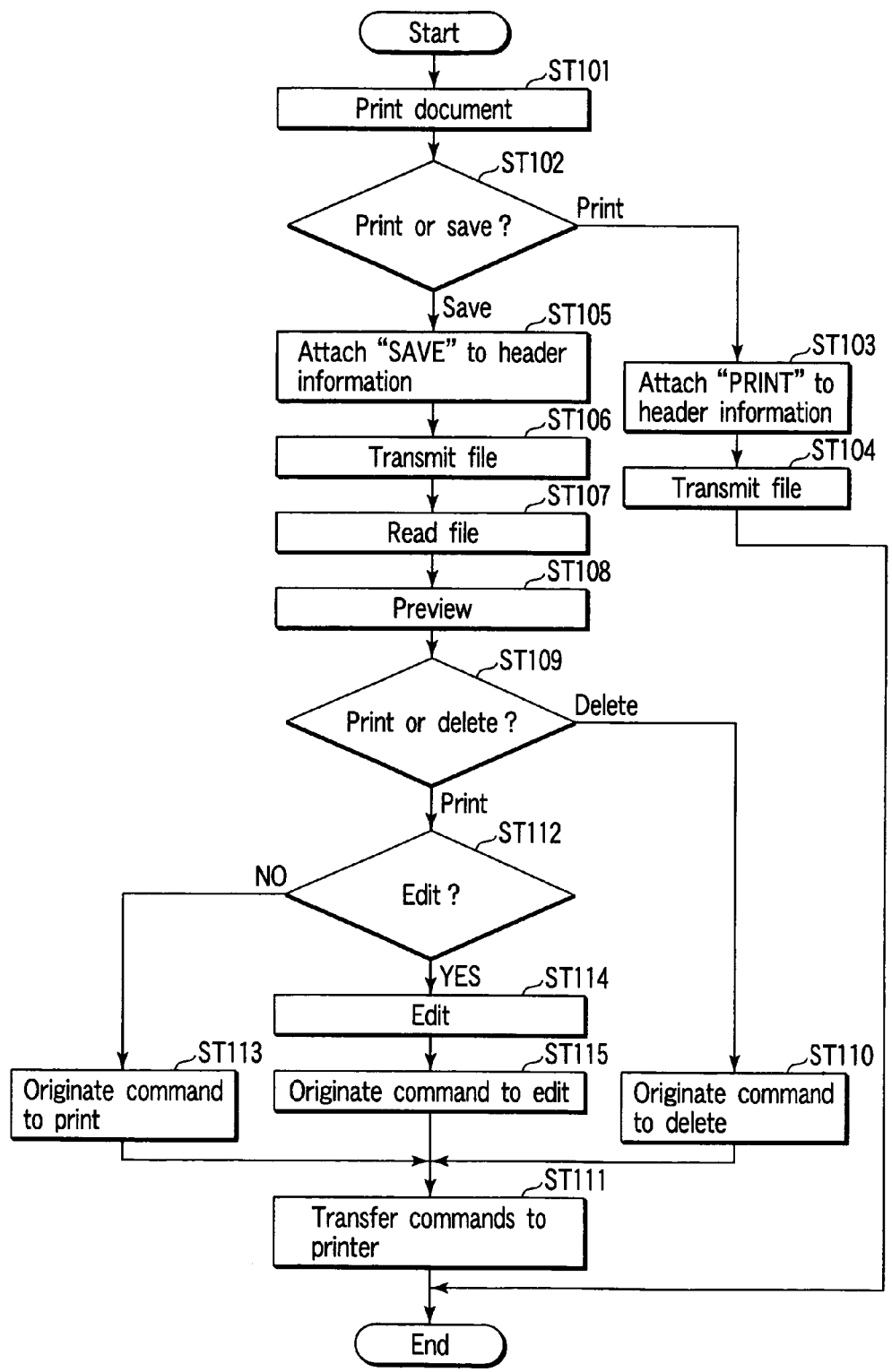
FIG. 4 is a flowchart showing processing on the terminal unit side executed to edit files according to the third embodiment.

Processing of a CPU (not shown) that is provided with terminal unit will first be described with reference to the flowchart of FIG. 4.

In Step ST101, the CPU accepts a command to print the document from the application. In Step ST102, the CPU accepts and identifies an input "PRINT" or "SAVE".

If the CPU identifies "PRINT" in Step ST102, the processing advances to Step ST103. In Step ST103, the CPU attaches selective information "PRINT" to the header information of the print job of the document. In Step ST104, the CPU transmits the print job to the reception port that is assigned to the user of the terminal unit of the multifunction apparatus 1. Thereupon, the processing terminates.

If the CPU identifies "SAVE" in Step ST102, the processing advances to Step ST105. In Step ST105, the CPU attaches selective information "SAVE" to the header information of the print job. In Step ST106, the print job is transmitted to the reception port that is assigned to the user of the terminal unit of the multifunction apparatus 1. Then, the processing advances to Step ST107.

If the CPU accepts a command to designate and read the files saved from the dedicated applications in Step ST107, it reads the files designated from the file save sections through the reception ports. In Step ST108, the CPU causes the display parts to preview the read files. In Step ST109, the CPU determines whether to print or delete the files in response to an input to print or delete the files from the dedicated applications.

If the CPU determines to "delete" in Step ST109, the processing advances to Step ST110. In Step ST110, the CPU originates a command to delete the files previewed on the display parts from the file save sections. Then, the processing advances to Step ST111.

If the CPU determines to "print" in Step ST109, the processing advances to Step ST112. In Step ST112, the CPU determines whether or not to edit the files in response to an input to edit or not the files from the dedicated applications.

If the CPU comes to the conclusion NO in Step ST112, the processing advances to Step ST113. In Step ST113, the CPU originates a command to print the read files. Then, the processing advances to Step ST111.

If the CPU comes to the conclusion YES in Step ST112, the processing advances to Step ST114. In Step ST114, an editing operation for the read files is accepted from the dedicated applications. In Step ST115, the CPU originates a command to edit the files in accordance with the accepted editing operation. Then, the processing advances to Step ST111.

In Step ST111, the commands originated in Steps ST110, ST113 and ST115 are transmitted to the CPU 11 of the multifunction apparatus 1. Thereupon, the processing terminates.

Figure 5:
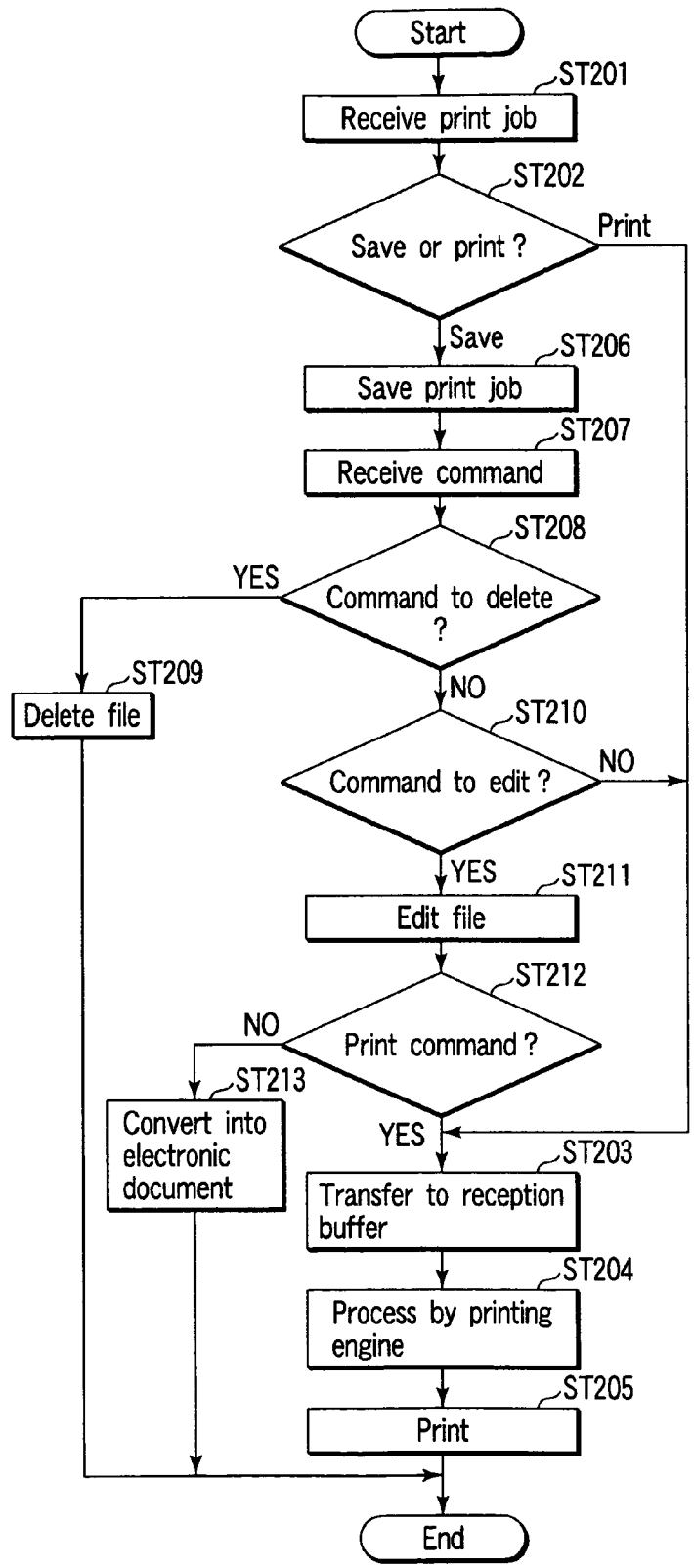
FIG. 5 is a flowchart showing processing on the multifunction apparatus side executed to edit files according to the third embodiment.

Processing the CPU 11 of the multifunction apparatus 1 executes will now be described with reference to the flowchart of FIG. 5.

In Step ST201, the CPU 11 detects the transmission of a print job to the reception port. In Step ST202, the CPU 11 determines whether to transfer the print job to the reception buffer 14 in accordance with the selected information attached to the header information of the print job or to store it in the file save section that corresponds to the reception port.

If the CPU 11 concludes that the selected information is "print" in Step ST202, the processing advances to Step ST203. In Step ST203, the CPU transfers the received print job to the reception buffer 14. In Step ST204, the print job is processed as predetermined by means of the printing engine 171. In Step ST205, the printing section 17 prints the print job that is processed by means of the printing engine 171.

If the CPU 11 concludes that the selected information is "save" in Step ST202, the processing advances to Step ST206. In Step ST206, the file is stored in the file save section that corresponds to the reception port through which the file is received.

When a command to read the file through the aforesaid reception port from the terminal unit in Step ST207, the file is displayed on the dedicated application of the terminal unit through the reception port. Then, the processing advances to Step ST208.

In Step ST208, the CPU 11 determines whether or not a command to delete the file is accepted from the terminal unit. If the CPU 11 comes to the conclusion YES in Step ST208, the processing advances to Step ST209. In Step ST209, the CPU 11 executes processing to delete the file from the file save section.

If the CPU 11 comes to the conclusion NO in Step ST208, the processing advances to Step ST210. In Step ST210, whether or not a command to edit the file is accepted from the terminal unit is determined. If the CPU 11 comes to the conclusion YES in Step ST210, the processing advances to Step ST211. In Step ST211, the CPU 11 edits the file in response to the command. Further, the presence of a print command is determined in Step ST212. If it is concluded in Step ST212 that there is a print command, the processing advances to Step ST203. If it is concluded in Step ST212 that there is no print command, the file is converted into an electronic document in Step ST213, whereupon this processing flow terminates. If the CPU 11 comes to the conclusion NO in Step ST210, the processing also advances to Step ST203. When the processing advances to Step ST203 in this manner, the CPU 11 further executes the processing of Steps ST204 and ST205. Thereupon, the processing terminates.

The user can recognize the file thus stored in the file save section. In this case, the user accesses his/her own file save section in the dedicated application, and causes the display part of the terminal unit to preview the saved file, thereby recognizing the file. Thus, the user can recognize the result of printing without outputting the print job to paper.

Further, the user can edit the file stored in his/her own file save section. In editing this file, the user also accesses the file save section through the reception port that is assigned to the user on the dedicated application of the terminal unit or the like. The user executes editing, such as scaling of the saved file, page replacement, repagination, reaffixing of headers and footers, etc. Since the edited file is saved as the electronic document, the user is expected only to print a necessary number of copies after the completion of file editing. Thus, once outputted printing jobs need not be edited and recopied, so that the print image quality never lowers. In editing the file, moreover, the user need not make a detour covering "electronic data", "paper output", "scanning", and "electronic document".

Further, the user can also compile a plurality of files stored in his/her own file save section into one file. By utilizing this editing function, files delivered from different applications can be compiled into one file and outputted as one document.

Furthermore, the user can edit files stored in other users' file save sections so that they can be added to the file stored in his/her own file save section. In doing this, the first user asks the other users to transmit the files read on the dedicated applications of the other users to his/her own reception port. Alternatively, the first user fetches the files by accessing the file save sections corresponding to the other users through the other users' reception ports, complies these files into one file on the dedicated application, and then executes printing. By doing this, the user can electronically edit the files and output them as prints even though the other users' terminal units have no function to edit the files. Even though the print jobs are originated from different applications, moreover, they are once converted into files, so that they can be compiled into one file.

In the arrangement described above, the files are edited from the dedicated applications of the terminal units. Alternatively, however, images read by scanning by means of the scanner section 19 may be stored in the file save sections and edited. The user authentication section 20 for authenticating the users is required in this case. In the multifunction apparatus 1 constructed in this manner, the images obtained by scanning by means of the scanner section 19 can be regarded as objects of editing.

In an example of this editing operation, the user edits first, second, and fourth pages from the file of an application A stored in his/her own file save section, a third page from a file of an application B, and a fifth page from an application C that is stored in another user's file save section. The user also edits an image read by means of scanner section 19 as a sixth page and stores it in his/her own file save section. Further, the user prints a given number of edited files. Thus, the user can edit various files and images.

A modification of the third embodiment will now be described. In the description to follow, like portions of the third embodiment and its modification are designated by like numerals, and a detailed description is omitted.

The following is a description of additional portions of the modification. The interface section 13 is provided with distribution ports 135a, 135b, 135c and 135d and transmission ports 136a, 136b, 136c and 136d. The distribution ports 135a to 135d and the transmission ports 136a to 136d are assigned individually to the users of terminal units. Further, the distribution ports 135a to 135d and the transmission ports 136a to 136d are located corresponding to the file save sections 231 to 234, respectively.

Information of file save sections, which distribute print jobs of the document that are transmitted from the terminal units to the distribution ports through the network 2, is attached to the header information of the print jobs. Thus, the print jobs that are received by the distribution ports are converted into a file of an electronic document that is converted into a general format used in the network by means of the conversion control section 24, and then stored in the file save section of the designated destination.

The file save sections 231 to 234 corresponding to the transmission ports 136a to 136d, respectively. The transmission ports 136a to 136d are ports that serve to accept commands from dedicated applications of the terminal units of the users to whom the ports are assigned, and to transmit data of the files stored in the file save sections so that they can be perused by means of the terminal units. By accessing the transmission ports corresponding to the file save sections to which the files are distributed, therefore, the users to whom the transmission ports are assigned can recognize the electronic documents through the dedicated applications of the display parts of the terminal units. Thus, the users' electronic documents can be opened to the public through the network.

In actually distributing the files, the users select "PRINT" from the printing properties of the terminal units, and further select "DISTRIBUTION PORT". The destination users can be selected from users who are registered in "PRINTING PROPERTIES" of the multifunction apparatus 1.

Messages that notify of the arrival of data, such as electronic documents, to the users to whom the transmission ports corresponding to the file save sections to which the electronic documents are distributed, are transmitted by electronic mail. With the passage of time, in this case, the electronic documents may possibly compress the data capacity of the print file save section 23 in the multifunction apparatus 1, so that they may be distributed with a time limit. More specifically, the electronic documents are automatically deleted when a fixed term has passed. The messages that are transmitted to the destination users in this manner may alternatively be originated by using private control software.

The following is a description of another method of opening the users' electronic documents to the public through the network. In transmitting the print jobs to the distribution ports, the users select those users who are registered in the printing properties of the multifunction apparatus 1, and attach information to give the right of access to the selected users to the header information. The print jobs are converted into electronic documents by means of the conversion control section 24 and stored in the file save sections that correspond to the reception ports. Further, mail that notifies the permission to access the electronic documents is sent to the users who are selected according to the header information. The users who are allowed to access the electronic documents can peruse the files with the dedicated applications by accessing the transmission ports corresponding to the file save sections in which the documents are stored or accessing new ports specially provided for the access. In this case, there is little possibility of the electronic documents compressing the data capacity of the print file save section 23 in the multifunction apparatus 1 with the passage of time.

As the electronic documents are distributed in this manner, the users can distribute data, such as electronic documents, to the other users who are registered in the multifunction apparatus 1 by executing the same operation for the printing from the applications of the terminal units.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus comprising:
a private port selected from a group composed of a plurality of user's private ports assigned to a plurality of users, individually, and two or more function-only ports;
a reception buffer which temporarily saves a print job received through the private port;
a setting/save section which is provided corresponding to the private port and saves set data on the printing system;
a printing section which reads the set data on the printing system from the setting/save section corresponding to the user's private port through which the print job is received when the print job stored in the reception buffer is printed and prints the print job in accordance with the read set data;
at least one of a fax section which has a fax function, a scanner section having a scanner function and an electronic mail section having an electronic mail function when the private port is a user's private port, wherein the setting/save section saves at least one of set data on the fax function, scanner function, and electronic mail function;
a user authentication section which accepts information indicative of the correspondence between the user setting/save section and the user; and
an operation section which accepts operation to execute the function in accordance with the set data stored in the user setting/save section after the information is accepted by the user authentication section.

2. An image forming apparatus according to claim 1, further comprising a port monitoring section which monitors the print job to carry out predetermined control when the private port is a user's private port.

3. An image forming apparatus according to claim 1, wherein a printing function to be stored in the setting/save section can be set in accordance with the frequency of use for each user when the private port is a function-only port.

* * * * *